(12) United States Patent
Starr

(10) Patent No.: US 8,037,001 B2
(45) Date of Patent: Oct. 11, 2011

(54) DETERMINING CORRECTIVE ACTIONS USING A GEOMETRICALLY-BASED DETERMINATION OF SUFFICIENT CONFIDENCE

(75) Inventor: Jeffrey W. Starr, Albuquerque, NM (US)

(73) Assignee: Honeywell International Inc., Morristown, NJ (US)

( * ) Notice: Subject to any disclaimer, the term of this patent is extended or adjusted under 35 U.S.C. 154(b) by 849 days.

(21) Appl. No.: 12/102,269

(22) Filed: Apr. 14, 2008

(65) Prior Publication Data

US 2009/0259879 A1 Oct. 15, 2009

(51) Int. Cl.
*G06F 17/00* (2006.01)
*G06N 5/00* (2006.01)
(52) U.S. Cl. .......................................................... 706/45
(58) Field of Classification Search .......................... None
See application file for complete search history.

(56) References Cited

U.S. PATENT DOCUMENTS

| | | | |
|---|---|---|---|
| 5,130,936 A * | 7/1992 | Sheppard et al. | 702/123 |
| 5,311,173 A * | 5/1994 | Komura et al. | 340/995.22 |
| 5,317,514 A | 5/1994 | Bancroft et al. | |
| 6,076,083 A | 6/2000 | Baker | |
| 6,456,622 B1 | 9/2002 | Skaanning et al. | |
| 6,917,839 B2 | 7/2005 | Bickford | |
| 6,957,202 B2 | 10/2005 | Skaanning et al. | |
| 7,305,132 B2 | 12/2007 | Singh et al. | |
| 2005/0096873 A1 | 5/2005 | Klein | |
| 2006/0047403 A1 | 3/2006 | Volponi et al. | |
| 2006/0142976 A1 | 6/2006 | Bonanni et al. | |

OTHER PUBLICATIONS

Le Berre et al. "Decision-Theoretic Diagnosis and Repair: Representational and Computational Issues", Proc. Intl. Principles of Diagnosis, 1997, pp. 5.*
Neumaier "Clouds, Fuzzy Sets and Probability Intervals", Reliable Computing, Kluwer, 2004, pp. 1-26.*
Tim Lund, Mike Robinson, Quantum Leap Innovations, Condition Monitoring Using Bayesian Networks, Nov. 8, 2006, pp. 10.
Pablo H. Ibaraguengoytia, Sunil Vadera and L. Enrique Sucar, A Probabilistic Model for Information and Sensor Validation. The Computer Journal, vol. 49 No. 1, 2006, pp. 113-126.
M. Steinder, A.S. Sethi, Computer and Information Sciences Department, University of Delaware, Newark, DE. Non-deterministic Event-driven Fault Diagnosis through Incremental Hypothesis Updating, Feb. 2003, pp. 16.

* cited by examiner

*Primary Examiner* — Jeffrey A Gaffin
*Assistant Examiner* — Li-Wu Chang
(74) *Attorney, Agent, or Firm* — Shumaker & Sieffert, P.A.

(57) ABSTRACT

A method, system, and apparatus for determining a corrective action for a diagnosable system are provided. A failure mode reasoning engine (FMRE) receives an evidence notification. The FMRE determines a plurality of evidentiary-failure-mode-probability rectangles (EFMPRs) based on the evidence notification. A candidate EFMPR in the plurality of EFMPRs is determined. The candidate EFMPR may be determined based on a distance from an origin of an evidentiary-failure-mode-probability graph. An overlap area is determined between the candidate EFMPR and the other EFMPRs in the plurality of EFMPRs. The overlap area is compared to an overlap threshold. If the overlap area is less than the overlap threshold, a reasoned failure mode (i.e., correct diagnosis) and/or a reasoned corrective action for the diagnosable system is determined, based on the candidate EFMPR. The FMRE may report and/or take the reasoned corrective action.

19 Claims, 5 Drawing Sheets

| 500 | Mapping Data Structure |
|---|---|
| 510 | Number of failure modes NFM |
| 512 | Number of pieces of evidence NPE |
| 520 | Failure mode probabilities |
| 530 | Evidence probabilities |
| 540 | Conditional probabilities p(E|FM) |
| 550 | Conditional probabilities p(FM|E) |
| 560 | Failure mode/corrective action mapping |
| 570 | Corrective action/cost mapping |

FIGURE 5

| 600 | Reasoned Failure Mode and Corrective Action Report |
|---|---|
| 610 | Reasoned failure mode: discharged battery |
| 620 | Evidence #1: |
| 622 | The headlights will not light. |
| 624 | Probability of failure mode given evidence: 0.3 |
| | Evidence #2: |
| | The engine will not turn over. |
| | Probability of failure mode given evidence: 0.8 |
| | Evidence #3: |
| | The battery is present in the motor vehicle. |
| | Probability of failure mode given evidence: 0.95 |
| 630 | Corrective action(s): |
| 632 | Jump-start battery  636 Cost: 1 |
| 634 | Replace battery  638 Cost: 3 |

FIGURE 6

DETERMINING CORRECTIVE ACTIONS USING A GEOMETRICALLY-BASED DETERMINATION OF SUFFICIENT CONFIDENCE

GOVERNMENT LICENSE RIGHTS

This invention was made with U.S. Government support under Contract No. W56 HZV-05-C-0724 awarded by the Department of the Army. The U.S. Government may have certain rights in this invention.

BACKGROUND OF THE INVENTION

Description of the Problem

Computerized reasoning engines may be used to diagnose a diagnosable system. Such reasoning engines typically draw a conclusion, or diagnosis, from a set of hypotheses about a condition in the diagnosable system. Reasoning engines may diagnose complex diagnosable systems, such as electronic systems, pneumatic systems, hydraulic systems, mechanical (or electro-mechanical) systems, and/or biological systems (e.g., computer-aided medical diagnosis systems).

The diagnosis or "failure mode" drawn by a reasoning engine may be based on evidence of conditions in the diagnosable system. For example, a sensor may recognize a voltage fluctuation of an electrical component in an electronic system. Based on evidence of the voltage fluctuation, a variety of failure modes may be possible, potentially ranging from a failure of the electrical component to an ensuing failure of the entire electronic system. In some applications, a reasoning engine may not have sufficient evidence to determine a failure mode with certainty.

Once a failure mode is determined, one or more corrective actions may be taken to repair the failure in the diagnosable system. A corrective action may have an associated cost. Such costs may include time, availability of repair personnel, material used for the corrective action (e.g., spare parts), and/or the unavailability of part or all of the complex system. Further, there may be a cost for merely waiting for more information before taking a corrective action.

BRIEF SUMMARY OF THE INVENTION

A first principal embodiment of the invention provides a method for determining a corrective action for a diagnosable system. The method comprises receiving a first evidence notification. Based on the first evidence notification, a first plurality of evidentiary-failure-mode-probability rectangles (EFMPRs) is determined. A first candidate EFMPR in the first plurality of EFMPRs is determined. An overlap area is determined between the first candidate EFMPR and the other EFMPRs in the first plurality of EFMPRs. A determination is made that the overlap area of the first candidate EFMPR is less than an overlap threshold. Responsive to determining that the overlap area of the first candidate EFMPR is less than the overlap threshold, determining a corrective action for the diagnosable system, based on the first candidate EFMPR.

A second principal embodiment of the invention provides a failure mode reasoning engine (FMRE). The FMRE comprises a processor, a network-communication interface, data storage and machine-language instructions stored in the data storage and executable by the processor. A plurality of failure-mode-probability ranges, a plurality of evidence-probability ranges, and a plurality of corrective actions are stored in the data storage. The machine-language instructions are executable by the processor to perform functions including: (a) receiving at least one evidence notification via the network-communication interface, (b) determining a plurality of EFMPRs, based on the at least one evidence notification, the plurality of failure-mode-probability ranges, and the plurality of evidence-probability ranges, (c) determining a candidate EFMPR of the plurality of EFMPRs, (d) determining a confidence level of the candidate EFMPR, (e) associating a corrective action with the candidate EFMPR, based on the plurality of corrective actions, and (f) sending the corrective action via the network-communication interface.

A third principal embodiment of the invention provides a diagnosable system. The diagnosable system comprises one or more evidence sources configured to report a status of part or all of the diagnosable system, a user interface, and an FMRE. The FMRE comprises (a) an evidence notification generator configured to generate an evidence notification upon receipt of evidence from the one or more evidence sources, (b) a failure-propagation-and-system/subsystem-interaction model (FPSIM) database configured to store a plurality of failure-mode probability ranges, evidence-probability ranges, and a plurality of corrective-action costs, and (c) a FPSIM configured to determine a corrective action for the diagnosable system. The corrective action is determined based a comparison of an overlap area of a candidate EFMPR with an overlap area threshold. Each EFMPR comprises a failure-mode probability range and an evidence-probability range. The overlap area threshold is determined based on a corrective-action cost in the plurality of corrective-action costs associated with the candidate EFMPR.

BRIEF DESCRIPTION OF THE DRAWINGS

Various examples of embodiments are described herein with reference to the following drawings, wherein like numerals denote like entities, in which:

FIG. 5 is an example mapping data structure, in accordance with embodiments of the invention; and FIG. 6 is an example reasoned failure mode and corrective action report, in accordance with embodiments of the invention.

DETAILED DESCRIPTION OF THE INVENTION

Figure 1:
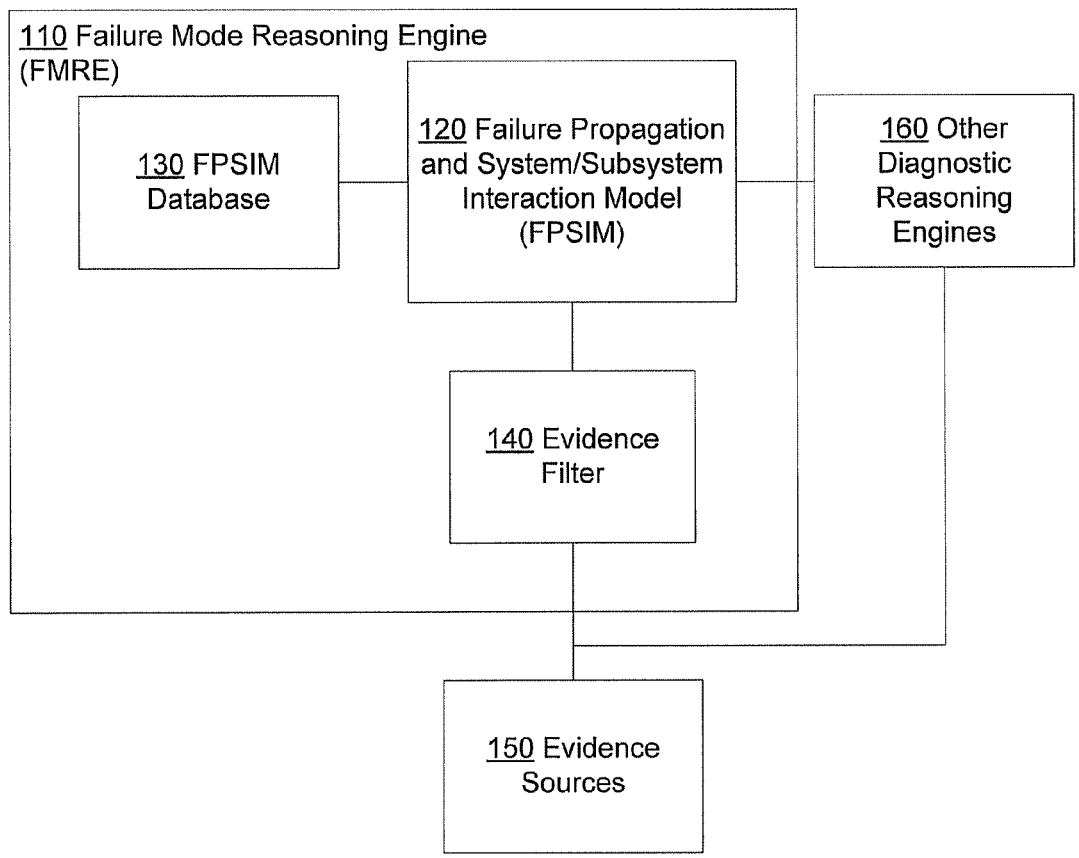
FIG. 1 is an example diagnosable system including a failure mode reasoning engine, evidence sources, other diagnostic reasoning engines, and a user interface, in accordance with embodiments of the invention.

The disclosed embodiments of this invention relate to the determination of corrective actions using a geometrically-based process as implemented in a combination of computer software, firmware, and hardware. It should be understood that this and other arrangements described herein are set forth only as examples. Those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. Various functions may be carried out by a processor executing instructions stored in memory.

Overview

A FMRE is provided that determines a corrective action of a diagnosable system. To diagnose the diagnosable system, one or more evidence sources may provide evidence to the FMRE. When a fault or other condition occurs in the diagnosable system, an evidence source may provide evidence of the fault or other condition to the FMRE in the form of an "evidence notification". Based on the evidence notification, the FMRE may generate a plurality of EFMPRs, where at least one EFMPR is generated for each failure mode of the diagnosable system. As such, a failure mode may be associated with each EFMPR.

An EFMPR may comprise a failure-mode probability range for a given failure mode as well as an evidence probability range. An EFMPR may determine the evidence probability range based on the evidence notification. Also, the FMRE may determine the failure-mode probability range based on a conditional probability of the failure mode given the evidence notification. A candidate EFMPR may be determined by the FMRE based determining a measure of the distance of the candidate EMFPR from an origin of an evidentiary-failure-mode-probability graph. Once the candidate EMFPR is determined, the FMRE may determine the overlap area between the candidate EFMPR and the remaining EFMPRs in the plurality of EFMPRs. The overlap area between the candidate EFMPR and the remaining EFMPRs may provide a confidence level for a "candidate failure mode" (i.e., a working diagnosis of a cause of the fault or other condition determined based on the evidence notification(s) received by the FMRE). The confidence level may be inversely related to the overlap area; that is, the smaller the overlap area, the higher the confidence level that a candidate failure mode is a "reasoned failure mode" (i.e., a correct diagnosis of a cause of the fault or other condition that is determined based on the evidence notification(s) received by the FMRE).

The overlap area may be compared to an overlap threshold. If the overlap threshold is exceeded, the FMRE may determine the confidence level is too low for the candidate failure mode to be a reasoned diagnosis given the evidence presented to the FMRE. The FMRE may wait for additional evidence notifications and/or request additional evidence. Upon reception of additional evidence notification(s), the FMRE may combine probability ranges for each EFMPR in the plurality of EFMPRs with ranges of evidence probabilities for the additional evidence and of conditional probabilities of a specific failure mode given the additional evidence notification(s). Once the probability ranges of each EFMPR have been combined, the FMRE may determine a second candidate EFMPR and a second overlap area of the second candidate EFMPR. A comparison of the second overlap area with the threshold may be made.

If the overlap threshold is not exceeded by the overlap area, the confidence level may be sufficient that the candidate failure mode is determined to be the reasoned failure mode. The reasoned failure mode may be output to a user of the FMRE. One or more reasoned corrective actions may be associated with the reasoned failure mode and the one or more reasoned corrective actions may be output to a user of the FMRE as well. The FMRE may be configured to take the one or more reasoned corrective actions.

This invention determines a failure mode in a diagnosable system in the presence of incomplete information based, in part, on the geometry of rectangles and their distance from an origin of an evidentiary-failure-mode-probability graph. As the FMRE gains additional evidence and combines the probabilities of each EFMPR, a new candidate failure mode may be determined with a higher confidence level based on the additional evidence. The ability of the FMRE to request additional evidence may reduce the time required to determine a failure mode with sufficient confidence.

The FMRE may adjust the overlap threshold based on cost of a corrective action, allowing the FMRE to adjust the confidence level based on a candidate corrective action. The use of EFMPRs in determining a confidence may minimize the time and/or cost required to determine a reasoned failure mode among a plurality of possible failure modes.

Determining a candidate failure mode based on the distance from the origin of an evidentiary-failure-mode-probability graph provides an efficient method of determining a candidate reasoned failure mode. The herein-described evidentiary-failure-mode-probability graph provides a visualization of the probabilities of competing diagnoses.

The method does not depend on the quality of any one piece of evidence; rather, it determines the quality of each piece of evidence based on other received pieces of evidence. The method is highly scalable as it scales with the number of failure modes, not the number of pieces of evidence. The overlap threshold can be modified to allow for higher or lower confidence levels of the reasoned failure mode. For example, in some applications (particularly real-time applications), a lower confidence level may be required before taking an action and as such the overlap threshold can be adjusted accordingly.

An Example Diagnosable System

FIG. 1 depicts an example diagnosable system 100 that comprises an FMRE 110, evidence sources 150, other diagnostic reasoning engines 160, in accordance with embodiments of the invention. The diagnosable system 100 may be an electronic, biological, and/or mechanical system.

The FMRE 110 comprises a FPSIM 120, a FPSIM database 130, and an evidence filter 140. The FPSIM 120 may be used as a probability-based model of diagnosable system 100. The FPSIM may comprise a plurality of EFMPRs. An EFMPR is described in detail below in the discussion of FIG. 2.

The FMRE 110 may determine multiple diagnoses simultaneously. For example, in a diagnosable system with many relatively independent components (such as a loosely coupled computer network), multiple independent failures may occur simultaneously within the diagnosable system. In the case of multiple independent failures, evidence gathered about a first failure may not apply to a second, independent failure and so the FMRE 110 may determine multiple failure modes, one for each independent failure. The FMRE 110 may determine multiple failure modes based on properties of the evidence, such as a location of evidence, a time of evidence, and/or a type of evidence. Also, the FMRE may determine multiple failure modes based on the probabilities of failure modes.

To generate the EFMPRs, the FPSIM 120 may interact with the FPSIM database 130. The FPSIM database 130 may comprise a mapping data structure for storing failure mode and evidence probabilities. The mapping data structure is described in detail below in the discussion of FIG. 5. The FPSIM database 130 may also store information used in determining when multiple diagnoses are required, such as locations of evidence sources 150 within the diagnosable system 100, types of evidence used to determine failure modes, as well as other information for determining failure modes, including information of the existence of multiple failure modes, may be stored as well in FPSIM database 130.

The evidence filter 140 may be used to generate a notification of evidence from an evidence source among the evidence sources 150. Each evidence source among the evidence sources 150 may provide information about one or more components of the diagnosable system 100. Example evidence sources comprise electrical sensors, mechanical sensors, electromechanical sensors, monitors for biological systems, information from the Internet, and the like. Many other evidence sources are possible as well. The evidence sources 150 may provide information such as electrical characteristics (e.g., voltage, capacitance, resistance, current, inductance), mechanical characteristics (e.g., torque, stress, weight, force, power), meteorological information (e.g., humidity, temperature, wind speed), and/or biological characteristics (e.g., respiration rate, pulse rate, blood chemistry, temperature). Many other types of information are possible as well.

The evidence filter 140 may filter or screen information from evidence sources 150 from the rest of the FMRE. The filtering may not report information unrelated to a diagnosis of the diagnosable system 100, repeated information, and/or information of insufficient weight to be treated as evidence by the FMRE. For example, an evidence source among the evidence sources 150 may provide one or more "heart beat" messages to indicate the evidence source is active. Such heart beat messages may not be reported by evidence filter 140 as unrelated and/or repeated information. In another example, an evidence source may indicate a changed condition within a normal operating range, such as an expected change in voltage. The changed condition may not indicate a failure in diagnosable system 100. The evidence filter 140 may not report the changed condition to the FPSIM 120.

The FPSIM 130 may interact with the evidence filter 140 by instructing it to send or not send information from a particular evidence source 150, by providing threshold information and/or expected ranges of values from one or more evidence sources 150, and/or by providing information used to determine repeated information. Other interactions between a FPSIM 130 and the evidence filter 150 are possible as well.

The FMRE 110 may interact with other reasoning engines 160 as well. The other reasoning engines may provide FMRE 110 with information about the evidence sources 150, provide alternate or supplementary diagnoses to a diagnosis from FMRE 110, or may receive similar information from FMRE 110. Interactions with other reasoning engines 160 may lead to one or more evidence notifications to FMRE 110.

An Example Evidentiary-Failure-Mode-Probability Rectangle Graph

Figure 2A:
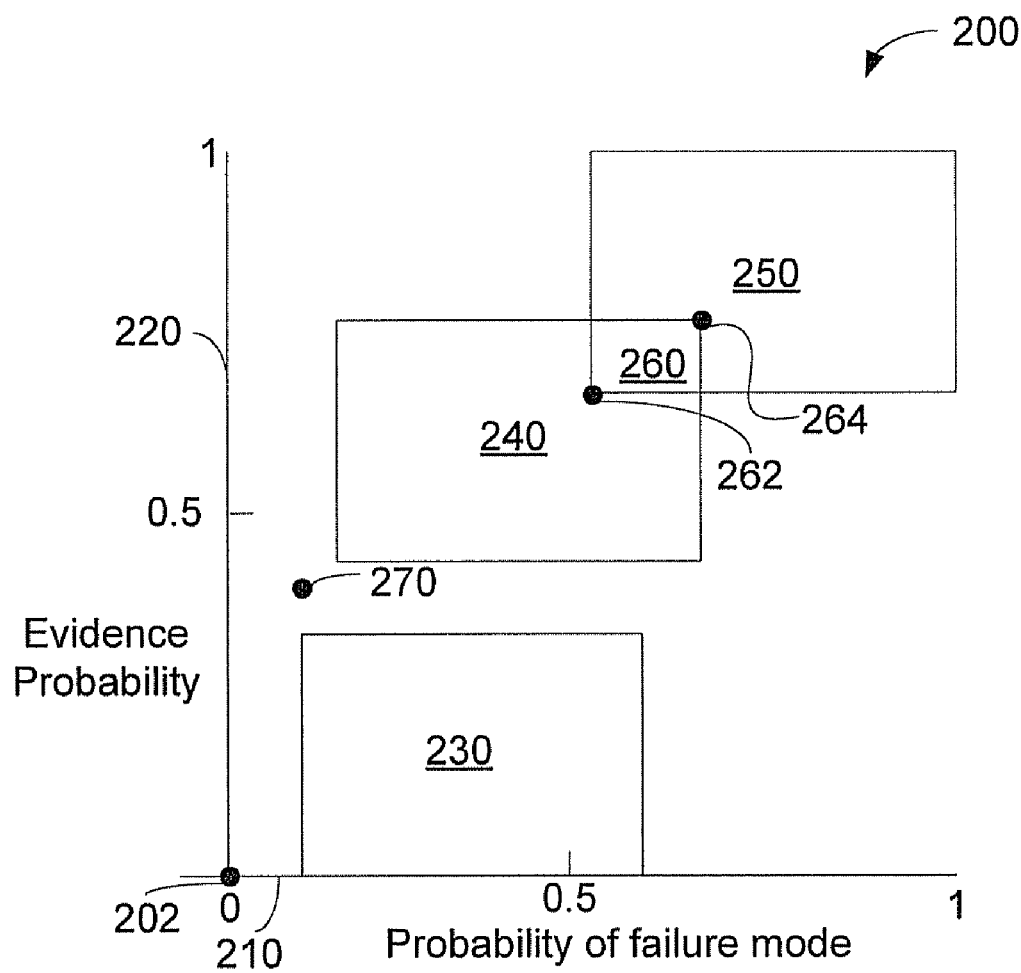
FIG. 2A is an example evidentiary-failure-mode-probability graph, depicting EFMPRs and an evidentiary-failure-mode probability point (EFMPP) using a horizontal failure-mode probability axis and a vertical evidence probability axis, in accordance with embodiments of the invention.

FIG. 2A is an example evidentiary-failure-mode-probability graph 200, depicting EFMPRs 230, 240, and 250 and an evidentiary-failure-mode probability point (EFMPP) 270 displayed with an origin 202, a horizontal failure-mode probability axis 210 and a vertical evidence probability axis 220, in accordance with embodiments of the invention. FMRE 110 may graphically indicate possible diagnoses of the diagnosable system 100 using an evidentiary-failure-mode-probability graph. The graphical indication may be performed using user interface 330. The graphical indication may be updated as FMRE receives evidence notifications as well.

Evidentiary-failure-mode-probability graph 200 comprises a failure-mode probability axis 210 and an evidence probability axis 220 joined at an origin 202. The horizontal axis (or x-axis) of FIG. 2A is a failure-mode probability axis 210. The failure-mode probability axis 210 may indicate the probability of a failure-mode. As the failure-mode probability axis 210 indicates probabilities, the failure-mode probability axis 210 may range from 0 to 1. A failure-mode probability of 0 may indicate that the failure mode is has no chance to occur (i.e., the failure mode is impossible), a failure-mode probability of 1 may indicate that the failure mode is certain to occur, and a failure-mode probability between 0 and 1 may indicate the likelihood for the failure mode to occur. For example, FIG. 2A shows EFMPR 230 having failure-mode probabilities from approximately 0.1 to approximately 0.6 along the failure-mode probability axis 210.

The vertical axis (or y-axis) of evidentiary-failure-mode-probability graph 200 is an evidence probability axis 220. The evidence probability axis 220 may indicate the probability of evidence. As the evidence probability axis 220 indicates probabilities, the evidence axis 220 may range from 0 to 1. The probability of evidence may vary depending on the failure mode; that is, given a body of evidence, the likelihood that the body of evidence would indicate the given failure mode may vary based on the failure mode. For example, FIG. 2A shows EFMPR 230 having evidence probabilities from 0 to approximately 0.166 along evidence probability axis 220. Note that any point in evidentiary-failure-mode-probability graph 200 may be written as (x,y), where x is the value of the point along the x-axis of evidentiary-failure-mode-probability graph 200 and y is value of the point along the y-axis of evidentiary-failure-mode-probability graph 200.

While FIG. 2A shows the horizontal axis as the failure-mode probability axis and the vertical axis as the evidence probability axis, it is to be understood that the axes may be shown in an evidentiary-failure-mode-probability graph 200 to be reversed as well (i.e., the evidentiary-failure-mode-probability graph 200 may show the failure-mode probability axis as the vertical axis and evidence probability axis as the horizontal axis).

Each EFMPR 230, 240, and 250 and EFMPP 270 may be correlated with a failure mode. Specifically, each EFMPR 230-250 and EFMPP 270 may be correlated with a failure-mode probability (x-axis) range that may comprise a minimum failure-mode probability and a maximum failure-mode probability. For example, as shown in FIG. 2B, EFMPR 230 is defined with reference to a failure mode probability range with a minimum failure-mode probability used to determine lower-left corner 232 and upper-left corner 236 of EFMPR 230 and a maximum failure-mode probability used to determine lower-right corner 234 and an upper-right corner 238.

Further, each EFMPR 230, 240, and 250 and EFMPP 270 may be determined with reference to evidence. The evidence may comprise one or more evidence notifications. Each evidence notification may comprise one or more attributes including: (1) an evidence location, which may describe and/or determine a place or component of the diagnosable system where evidence is gathered (e.g., the name of a faulty component, latitude/longitude, street address or other location information), (2) an evidence type, which may describe a quality or sort of evidence gathered (e.g., voltage, resistance, temperature, blood pressure, torque, time to respond), and/or (3) an evidence value, which may provide a numerical value for the evidence (e.g., +5 volts, 100 degrees, 30 seconds to respond). An evidence notification may comprise many other locations of evidence, types of evidence, and values for evidence as well as many other attributes.

Each EFMPR may be correlated with an evidence probability (y-axis) range that may comprise a minimum evidence probability and a maximum evidence probability. The minimum and maximum evidence probabilities, respectively, may be determined based on the one or more evidence notifications. More specifically, the minimum and maximum evidence probabilities, respectively, may be determined based on the evidence location(s), the evidence type(s), and/or the evidence value(s).

Figure 2B:
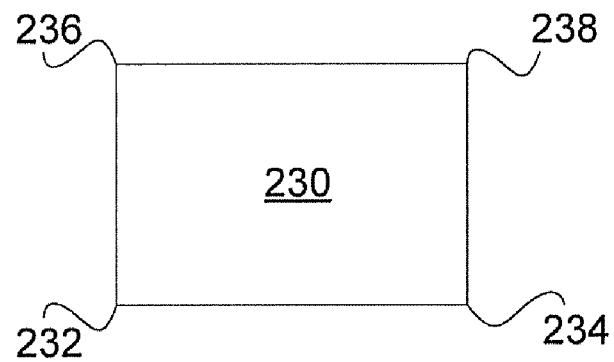
FIG. 2B is a depiction of an example evidentiary-failure-mode probability rectangle, in accordance with embodiments of the invention.

For example, as shown in FIG. 2B, EFMPR 230 is defined with reference to a evidence probability range with a minimum evidence probability used to determine lower-left corner 232 and lower-right corner 236 of EMFPR 230 and a maximum evidence probability used to determine upper-left corner 236 and upper-right corner 238. Therefore, the EFMPR corners of EFMPR 230 as depicted in FIG. 2B may be defined as shown in Table 1:

TABLE 1

| Corner | Failure-mode probability range value (x-axis value) for corner | Evidence probability range value (y-axis value) for corner |
|---|---|---|
| lower-left corner 232 | Minimum failure-mode probability | Minimum evidence probability |
| lower-right corner 234 | Maximum failure-mode probability | Minimum evidence probability |
| upper-left corner 236 | Minimum failure-mode probability | Maximum evidence probability |
| upper-right corner 238 | Maximum failure-mode probability | Maximum evidence probability |

An EFMPR may be defined by lower-left corner 232 and upper-right corner 238, as the lower-left corner is defined with reference to the minimum failure-mode probability and the minimum evidence probability and the upper-right corner 238 is defined with reference to the maximum failure-mode probability and the maximum evidence probability. An EFMPR may be an EFMPP if the lower-left corner 232 is the same as the upper-right corner 238, and the EFMPR thus comprises only one point.

FIG. 2A shows EMFPR 250 as the EMFPR that is the furthest from the origin 202. As such, the upper-right corner of EFMPR 250 is the furthest from the origin 202 of all EFMPRs and EFMPPs shown in FIG. 2A. FIG. 2A shows an overlap region 260 where EFMPR 250 is overlapped by EFMPR 240. An overlap region of a first rectangle R1 with lower-left corner coordinate (min_x1, min_y1) and upper-right corner coordinate (max_x1, max_y1) and a second rectangle R2 with lower-left coordinate (min_x2, min_y2) and upper-right coordinate (max_x2, max_y2) may be determined using the following process:

1. Determine if R1 and R2 overlap by determining if (max_y1>min_y2) and (max_y2>min_y1) and (max_x1>min_x2) and (max_x2>min_x1). R1 and R2 overlap if all of these conditions are true.
2. Determine the lower-left corner of an overlap region by determining (max_min_x, max_min_y), where max_min_x is the maximum of (min_x1, min_x2) and where max_min_y is the maximum of (min_y1, min_y2).
3. Determine the upper-right corner of the overlap region by determining (min_max_x, min_max_y) where min_max_x is the minimum of (max_x1, max_x2) and where min_max_y is the minimum of (max_y1, max_y2).

As an example of this process, if R1 is EFMPR 240 and R2 is EFMPR 250, the rectangles are determined to overlap as the maximum y-axis value of R1 is greater than the minimum y-axis value of R2, the maximum y-axis value of R2 is greater than the minimum y-axis value of R1, the maximum x-axis value of R1 is greater than the minimum x-axis value of R2, and the maximum x-axis value of R2 is greater than the minimum x-axis value of R1. Continuing with the process described above, the lower left corner of the overlap region is determined to be point 262 and the upper right corner of the overlap region is point 264.

The area A of a rectangle R1 defined by a lower-left corner (min_x1, min_y1) and an upper-right corner (max_x1, max_y1) may be determined by the rectangle area formula:

$$A=(max\_x1-min\_x1)*(max\_y1-min\_y1).$$

Using the rectangle area formula, area of an overlap region or "overlap area" OA is:

$$OA=(min\_max\_x-max\_min\_x)*(min\_max\_y-max\_min\_y).$$

The EFMPP 270 may be considered to be an EFMPR where the minimum failure-mode probability equals the maximum failure-mode probability and the minimum evidence probability equals the maximum evidence probability. For example, as shown in FIG. 2A, EFMPP 270 is depicted as having equal minimum and maximum failure-mode probabilities of approximately 0.1 and equal minimum and maximum evidence probabilities of approximately 0.4. Note that EFMPP 270 is depicted in FIG. 2A as a large dot rather than a single point for readability.

An Example Computing Device

Figure 3:
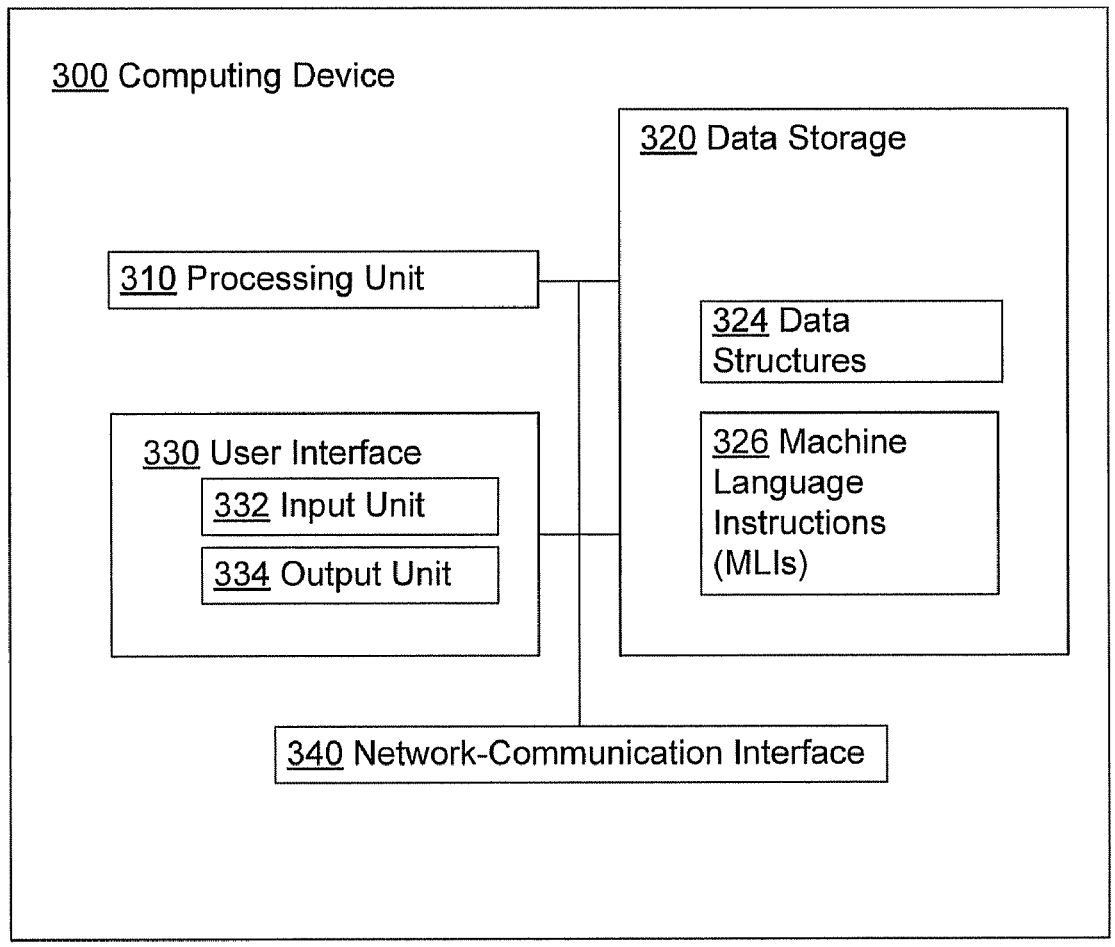
FIG. 3 is an example of a computing device, in accordance with embodiments of the invention.

FIG. 3 is a block diagram of an example computing device 300, comprising a processing unit 310, data storage 320, a user interface 330, and a network-communication interface 340, in accordance with embodiments of the invention. A computing device 300 may be a desktop computer, laptop or notebook computer, personal data assistant (PDA), mobile phone, or any similar device that is equipped with a processing unit capable of executing computer instructions that implement at least part of the herein-described method 400 and/or herein-described functionality of an FMRE.

The processing unit 310 may include one or more central processing units, computer processors, mobile processors, digital signal processors (DSPs), microprocessors, computer chips, and similar processing units now known and later developed and may execute machine-language instructions and process data.

The data storage 320 may comprise one or more storage devices. The data storage 320 may include read-only memory (ROM), random access memory (RAM), removable-disk-drive memory, hard-disk memory, magnetic-tape memory, flash memory, and similar storage devices now known and later developed. The data storage 320 comprises at least enough storage capacity to contain data structures 324 and machine-language instructions 326. Data structures 324 comprise at any mappings, ranges, rectangle, lists, and any other data structures described herein required to perform some or all of the functions of a herein-described FMRE, and/or to perform some or all of the procedures described in method 400. The machine-language instructions 326 contained in the data storage 320 include instructions executable by the processing unit 310 to perform some or all of the functions of a herein-described FMRE and/or to perform some or all of the procedures described in method 400.

The user interface 330 may comprise an input unit 332 and/or an output unit 334. The input unit 332 may receive user input from a user of the computing device 330. The input unit 332 may comprise a keyboard, a keypad, a touch screen, a computer mouse, a track ball, a joystick, and/or other similar devices, now known or later developed, capable of receiving user input from a user of computing device 300. The output unit 334 may provide output to a user of the computing device 330. The output unit 334 may comprise one or more cathode ray tubes (CRT), liquid crystal displays (LCD), light emitting diodes (LEDs), displays using digital light processing (DLP) technology, printers, light bulbs, and/or other similar devices, now known or later developed, capable of displaying graphical, textual, and/or numerical information to a user of computing device 300.

The user interface 330 may allow a user or other person interacting with diagnosable system 100 to receive information from and/or provide information to FMRE 110 and/or other reasoning systems 160. The user may receive diagnoses, corrective action, and/or other information via output unit 334 of user interface 330, such as a likely failure mode and corrective action report shown in FIG. 6. Output unit 334 may display one or more EFMPRs to the user of FMRE 110 to graphically indicate one or more possible diagnoses of the diagnosable system 100. The user may provide information about the diagnosable system 100, authorization to gather evidence and/or take corrective actions, and/or provide other information via input unit 332.

The network-communication interface 340 is configured to send and receive data and may include a wired-communication interface and/or a wireless-communication interface. The wired-communication interface, if present, may comprise a wire, cable, fiber-optic link or similar physical connection to a wide area network (WAN), a local area network (LAN), one or more public data networks, such as the Internet, one or more private data networks, or any combination of such networks. The wireless-communication interface, if present, may utilize an air interface, such as an IEEE 802.11 (e.g., Wi-Fi) interface to a WAN, a LAN, one or more public data networks (e.g., the Internet), one or more private data networks, or any combination of public and private data networks.

In embodiments of the invention, the input unit 332 and/or output unit 334 may be remotely located from computing device 300. In this case, the processing unit 310 of computing device 300 may communicate with a remotely-located input unit 332 and/or remotely-located output unit 334. For example, processing unit 310 may communicate with the remotely-located input unit 332 to request user input and remotely-located input unit 332 may communicate with processing unit 310 to provide the requested user input. Also, processing unit 310 and remotely-located input unit 332 may communicate to provide diagnostic and/or status information about remotely-located input unit 332. Other communications are possible between processing unit 310 and remotely-located input unit 332.

Similarly, processing unit 310 may communicate with the remotely-located output unit 334 to request display of user output. Remotely-located output unit 334 may provide information, such as an acknowledgment, about the user output displayed. Also, processing unit 310 and remotely-located output unit 334 may communicate to provide diagnostic and/or status information about remotely-located output unit 334. Other communications are possible between processing unit 310 and remotely-located output unit 334.

The computing device 300 may communicate with a remotely-located input unit 332 and/or remotely-located output unit 334 via network-communication interface 340. As such, the computing device 300 may connect to a remotely-located input unit 332 and/or remotely-located output unit 334 via wired network, a wireless network, and/or a combination of wired and wireless networks.

A Method for Determining a Corrective Action for a Diagnosable System

Figure 4:
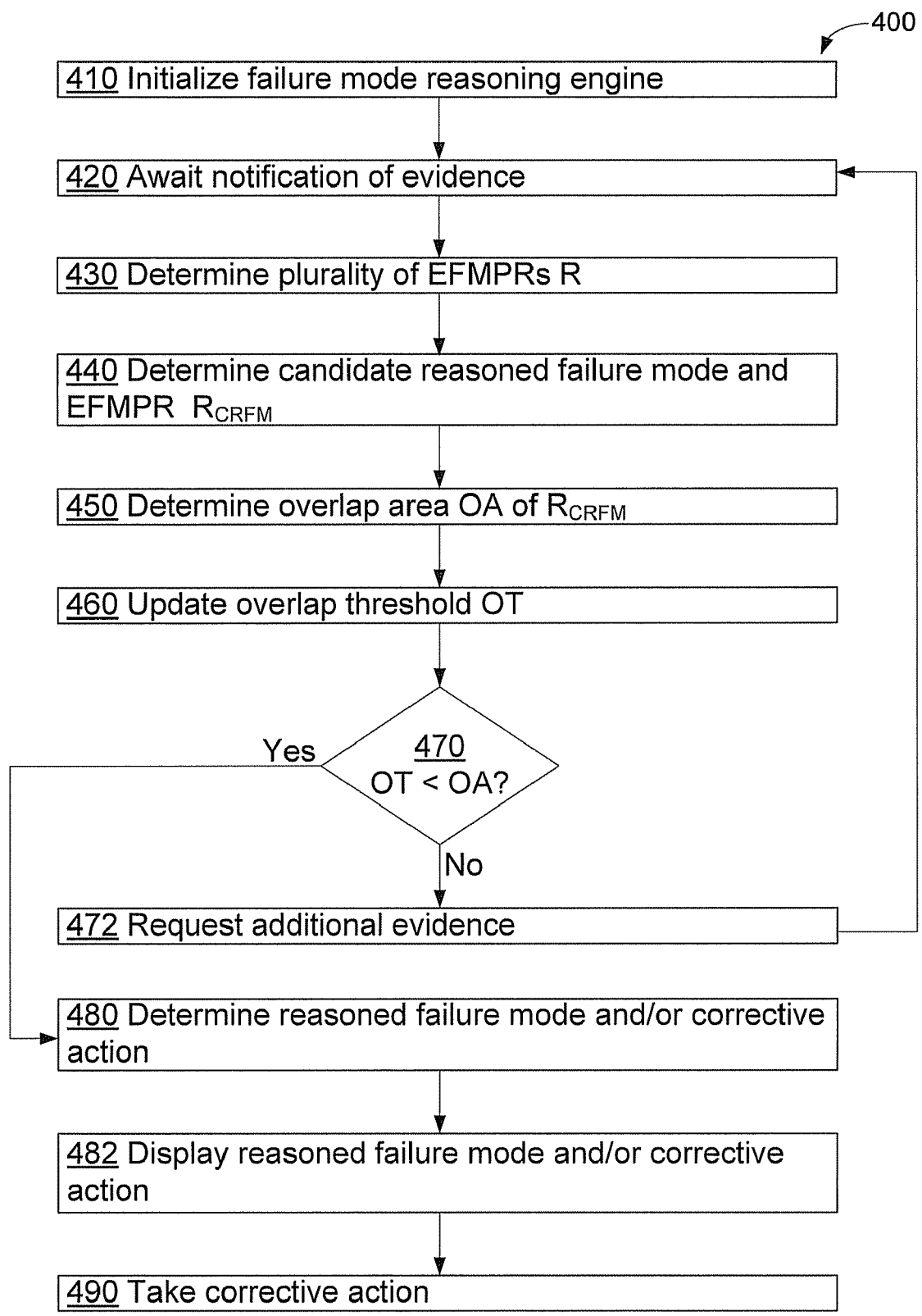
FIG. 4 is a flowchart of an example method, in accordance with embodiments of the invention.

FIG. 4 is a flowchart of a method 400 that determines a corrective action for a diagnosable system 100, in accordance with embodiments of the invention. It should be understood that each block in this flowchart and within other flowcharts presented herein may represent a module, segment, or portion of computer program code, which includes one or more executable instructions for implementing specific logical functions or steps in the process. Alternate implementations are included within the scope of the example embodiments in which functions may be executed out of order from that shown or discussed, including substantially concurrently or in reverse order, depending on the functionality involved, as would be understood by those reasonably skilled in the art of the described embodiments.

At block 410, the FMRE 110 is initialized. Initialization may comprise determining an overlap threshold OT, an evidence waiting time Delta, last notification of evidence time $T_{OLD}$, and/or a mapping data structure.

FIG. 5 is an example mapping data structure 500, in accordance with embodiments of the invention. The mapping data structure 500 may comprise a number of failure modes NFM 510, a number of pieces of evidence NPE 512, a plurality of failure-mode probabilities 520, a plurality of evidence probabilities 530, a plurality of conditional probabilities expressing the probability of a specific piece of evidence given a specific failure mode p(E|FM) 540, a plurality of conditional probabilities expressing the probability of a specific failure mode given a specific piece of evidence p(FM|E) 550, a failure mode/corrective action mapping 560, and/or a corrective action/cost mapping 570. The mapping data structure 500 may be part of a database and/or may comprise data from a database, such as the FPSIM database 130.

There may be at least one failure-mode probability in the plurality of failure-mode probabilities 520 for each of the NFM failure modes. Further, each failure-mode probability in the plurality of failure mode probabilities may be expressed as a single failure-mode probability value or as a failure-mode-probability range. Similarly, there may be at least one evidence probability in the plurality of evidence probabilities for each of the NPE possible pieces of evidence. Each evidence probability may be expressed as single evidence probability or as an evidence-probability range. There may be at least one conditional probability for each piece of evidence/failure mode pair (for a total of NFM*NPE total pairs) in the pluralities of conditional probabilities p(E|FM) 540 and p(FM|E) 550, respectively.

The plurality of failure mode probabilities 520, plurality of evidence probabilities 530, and plurality of conditional probabilities p(E|FM) 540 may be provided by a manufacturer of a diagnosable system 100. Then, the each of the plurality of conditional probabilities $p(FM_i|E_j)$ may be determined using Bayes' formula:

$$p(FM_i \mid E_j) = \frac{p(E_j \mid FM_i) * p(FM_i)}{p(E_j)}, \; p(E_j) > 0,$$

where:
$FM_i$ is a given failure mode i with i in the range [1,NFM],
$E_j$ is a given piece of evidence j, with j in the range [1,NPE],
$p(FM_i)$ is the probability of a failure mode i occurring, and
$p(E_j)$ is the probability of a piece of evidence j occurring.
Note that $p(FM_i|E_j)$ may be defined to be 0 if $p(E_j)=0$.

The following formulas, based on Bayes' formula above, may be used to determine a conditional probability range $p(FM_i|E_j)$ with a minimum conditional probability $\min\_p$ $(FM_i|E_j)$ and a maximum conditional probability range $\max\_p(FM_i|E_j)$:

$$\min\_p(FM_i \mid E_j) = \frac{\min\_p(E_j \mid FM_i) * \min\_p(FM_i)}{\min\_p(E_j)}, \min\_p(E_j) > 0,$$

and $$\max\_p(FM_i \mid E_j) = \frac{\max\_p(E_j \mid FM_i) * \max\_p(FM_i)}{\max\_p(E_j)}, \max\_p(E_j) > 0$$

where:
$\min\_p(E_j|FM_i)$ is the minimum conditional probability of a piece of evidence $E_j$ occurring given a failure mode $FM_i$,
$\min\_p(FM_i)$ is a minimum failure-mode probability of failure mode i, where i is in the range [1,NFM],
$\min\_p(E_j)$ is a minimum evidence probability of piece of evidence j, where j is in the range [1,NPE],
$\max\_p(E_j|FM_i)$ is the maximum conditional probability of a piece of evidence $E_j$ occurring given a failure mode $FM_i$,
$\max\_p(FM_i)$ is a maximum failure-mode probability of failure mode i, where i is in the range [1,NFM], and
$\max\_p(E_j)$ is a maximum evidence probability of piece of evidence j, where j is in the range [1,NPE].

Note that $\min\_p(FM_i|E_j)$ may be defined to be 0 if $\min\_p$ $(E_j)=0$ and that $\max\_p(FM_i|E_j)$ may be defined to be 0 if $\max\_p(E_j)=0$.

The mapping data structure 500 may comprise a corrective action/failure mode mapping 560. The corrective action/failure mode mapping 560 may provide an association or correspondence between each failure mode i, where i in the range [1,NFM], and one or more corrective actions $CA_k$, where k is in the range [1,NCA], and NCA is the number of corrective actions. The corrective action/failure mode mapping 560 may be a relational database table or similar data structure with a key attribute of a failure mode and one or more corrective action attributes. The corrective action attribute(s) may comprise one or more corrective actions for the key attribute of a failure mode. In an embodiment of the invention, there may be one corrective action for each failure mode; that is, NFM=NCA.

For example, suppose a failure mode of "discharged battery" had two corrective actions: jump start the battery and replace the battery. Then, corrective action/failure mode mapping 560 may comprise a relational database table or similar data structure with a row or similar entry with a key attribute of a failure mode of "discharged battery" and at least two corrective action attributes of "jump-start battery" and "replace battery".

Note that a numerical value or other representations of the failure mode may be stored as the key attribute of a failure mode and/or numerical value(s) or other representation(s) of the corrective action attribute(s) of corrective action/failure mode mapping 560. For example, if a "discharged battery" failure mode was designated as failure mode 4 and corrective actions of "jump-start battery" and "replace battery" were designated as corrective actions "B1" and "B2", the corrective action/failure mode mapping 560 may comprise a relational database table or similar data structure with a row or similar entry with a key attribute of a failure mode of "4" and at least two corrective action attributes of "B1" and "B2".

The mapping data structure 500 may comprise a corrective action/cost mapping 570. The corrective action/cost mapping 570 may provide an association or correspondence between each corrective action $CA_k$, where k is in the range [1,NCA] and a cost $C_k$. Each $C_k$ may represent the cost of taking the corresponding corrective action $CA_k$. A cost $C_k$ may take into account the time, financial cost, difficulty, availability of required materials, the cost of the unavailability of the diagnosable system, and other real and potential costs to taking the corrective action. Many other real and potential costs may be considered as well.

The corrective action/cost mapping 570 may be a relational database table or similar data structure with a key attribute of a corrective action and a cost attribute. The cost attribute may comprise a cost for the key attribute of a corrective action. For example, suppose a corrective action of "jump-start battery" had a cost of "1" associated with the corrective action. Then, corrective action/cost mapping 570 may comprise a relational database table or similar data structure with a row or similar entry containing a key attribute of a corrective action of "jump-start battery" and a cost attribute of "1".

Note that a numerical value or other representations of the corrective action may be stored as the key attribute of a corrective action and/or non-numerical representation(s) of the cost attribute(s) may be stored in corrective action/cost mapping 570. For example, if a "jump-start battery" corrective action was designated as corrective action "B1", the corrective action/cost mapping 570 may comprise a relational database table or similar data structure with a key attribute of "B1" and a cost attribute of "1." A cost attribute may indicate a further determination of a cost of a corrective action is to be made, such as a determination of costs of subsequent and/or prior corrective actions, the cost of materials and/or labor needed for a corrective action, or other determinations of cost. For example, suppose a cost attribute of "jumpstart+tow+replacement" were stored in corrective action/cost mapping 570 were stored for a corrective action of "replace battery". FMRE 110 may determine the cost of the "replace battery" corrective action was the cost of a "jumpstart" corrective action plus the cost of a "tow" corrective action plus the cost of a "replacement" corrective action. The cost of a corrective action may be associated with a unit of measure, such as currency or time units (e.g., a cost of a corrective action of "200" may indicate a cost of $200 or a cost of 200 minutes).

Returning to FIG. 4, at block 410 a plurality of EFMPRs R may be initialized to indicate that each rectangle $R_i$ in the plurality of EFMPRs has not yet been used. Let NR be the number of rectangles in the plurality of EFMPRs R. The plurality of EFMPRs R may have at least one EFMPR for each failure mode, and so NR≧NFM. In an embodiment of the invention, there is exactly one EFMPR for each failure mode (i.e., NR=NFM). The FPSIM 120 may comprise the plurality of rectangles R.

At block 420, the FMRE 110 waits for a notification of evidence. Assume that the notification of evidence corresponds to piece of evidence $E_j$, where j is in the range [1, NPE]. Upon reception of a notification of evidence, FMRE 110 may set $T_{OLD}$ to the time the notification is received.

At block 430, a plurality of EFMPRs R is determined based on the received notification of evidence. An example process for determining an EFMPR $R_i$ for a specific failure mode $FM_i$ for i in the range [1, NFM] and j in the range [1, NPE] is:
1. Determine the minimum and maximum conditional probability of the specific failure mode $FM_i$ given the received piece of evidence $E_j$; that is, determine $\min\_p$ (FM$_i$|E$_j$) and max_p(FM$_i$|E$_j$), respectively. min_p(FM$_i$|E$_j$) and max_p(FM$_i$|E$_j$) may be determined by searching for the conditional probabilities p(FM|E) 550 in the mapping data structure 500 based on a specific failure mode FM$_i$ and the received piece of evidence E$_j$.

2. Determine the minimum and maximum probability of the received piece of E$_j$; that is determine min_p(E$_j$) and max_p(E$_j$), respectively. min_p(E$_j$) and max_p(E$_j$) may be determined by searching the evidence probabilities 520 in the mapping data structure 500 for the specific piece of evidence E$_j$.

3. If R$_i$ indicates that it has not yet been used, set the failure-mode probabilities and evidence mode probabilities of R$_i$ to the probabilities determined in steps 1 and 2 above. Specifically, let min_fm_p(R$_i$) be the minimum failure-mode probability of EFMPR R$_i$, max_fm_p(R$_i$) be the maximum failure-mode probability of EFMPR R$_i$, min_e_p(R$_i$) be the minimum evidence probability of EFMPR R$_i$, and max_e_p(R$_i$) be the maximum evidence probability of EFMPR R$_i$. Then, set:
min_fm_p(R$_i$)=min_p(FM$_i$|E$_j$)
max_fm_p(R$_i$)=max_p(FM$_i$|E$_j$)
min_e_p(R$_i$)=min_p(E$_j$) and
max_e_p(R$_i$)=max_p(E$_j$).

Also, the FMRE 110 may indicate that EFMPR R$_i$ has been used. The determination of EFMPR R$_i$ for failure mode FM$_i$ is complete.

4. If R$_i$ indicates that it has been used, then combine the failure-mode probability range of R$_i$ with min_p(FM$_i$|E$_j$) and max_p(FM$_i$|E$_j$). Then, min_fm_p(R$_i$) may be combined with min_p(FM$_i$|E$_j$) using the formula:

$$\text{min\_fm\_p}(R_i) = \frac{Y1 * Z1}{Y1 * Z1 + [(1 - Y1) * (1 - Z1)]}$$

where: Y1=min_fm_p(R$_i$) and Z1=min_p(FM$_i$|E$_j$). Similarly, max_fm_p(R$_i$) may be combined with min_p(FM$_i$|E$_j$) using the formula:

$$\text{max\_fm\_p}(R_i) = \frac{Y2 * Z2}{Y2 * Z2 + [(1 - Y2) * (1 - Z2)]}$$

where: Y2=max_fm_p(R$_i$) and Z2=max_p(FM$_i$|E$_j$).

5. If R$_i$ indicates that it has been used, then combine the evidence probability range of R$_i$ with min_p(E$_j$) and max_p(E$_j$). min_e_p(R$_i$) may be combined with min_p(E$_j$) using the formula:

$$\text{min\_e\_p}(R_i) = \frac{Y3 * Z3}{Y3 * Z3 + [(1 - Y3) * (1 - Z3)]}$$

where: Y3=min_e_p(R$_i$) and Z3=min_p(E$_j$). Similarly, max_e_p(R$_i$) may be combined with max_p(E$_j$) using the formula:

$$\text{max\_e\_p}(R_i) = \frac{Y4 * Z4}{Y4 * Z4 + [(1 - Y4) * (1 - Z4)]}$$

where: Y4=max_e_p(R$_i$) and Z4=max_p(E$_j$).

This example process for determining an EFMPR R$_i$ for a specific failure mode FM$_i$ may be performed for each EFMPR R$_i$ in the plurality of EFMPRs.

For example, suppose an EFMPR R$_i$ has not been used and FMRE 110 receives an evidence notification E1. For the failure mode FM$_i$ associated with EFMPR R$_i$, suppose the minimum evidence probability of E1 is 0.2 and the maximum evidence probability of E1 is 0.6. Further assume that the minimum probability of FM$_i$ given E1 is 0.4 and the maximum probability of FM$_i$ given E1 is 0.8. As EMFPR R$_i$ has not been used:
min_fm_p(R$_i$)=min_p(FM$_i$|E$_j$)=0.4,
max_fm_p(R$_i$)=max_p(FM$_i$|E$_j$)=0.8,
min_e_p(R$_i$)=min_p(E$_j$)=0.2, and
max_e_p(R$_i$)=max_p(E$_j$)=0.6.

FMRE 110 may indicate EFMPR R$_i$ has been used upon determination of the values above.

Assume FMRE 110 later receives a notification of evidence E2. For the failure mode FM$_i$ associated with EFMPR R$_i$, suppose the minimum evidence probability of E2 is 0.3 and the maximum evidence probability of E1 is 0.4. Further assume that the minimum probability of FM$_i$ given E1 is 0.5 and the maximum probability of FM$_i$ given E1 is 0.9.

Then, as EFMPR R$_i$ is indicated as having been used, the probabilities may be combined with R$_i$ as follows (to three significant figures):

$$\text{min\_fm\_p}(R_i) = \frac{Y1 * Z1}{Y1 * Z1 + [(1 - Y1) * (1 - Z1)]}$$
$$= \frac{0.4 * 0.5}{0.4 * 0.5 + 0.6 * 0.5}$$
$$= 0.4$$

$$\text{max\_fm\_p}(R_i) = \frac{Y2 * Z2}{Y2 * Z2 + [(1 - Y2) * (1 - Z2)]}$$
$$= \frac{0.8 * 0.9}{0.8 * 0.9 + 0.2 * 0.1}$$
$$= 0.973$$

$$\text{min\_e\_p}(R_i) = \frac{Y3 * Z3}{Y3 * Z3 + [(1 - Y3) * (1 - Z3)]}$$
$$= \frac{0.2 * 0.3}{0.2 * 0.3 + 0.8 * 0.7}$$
$$= 0.0968$$

$$\text{max\_e\_p}(R_i) = \frac{Y4 * Z4}{Y4 * Z4 + [(1 - Y4) * (1 - Z4)]}$$
$$= \frac{0.6 * 0.4}{0.6 * 0.4 + 0.4 * 0.6}$$
$$= 0.5$$

At block 440, the FMRE 110 may determine a candidate EMFPR R$_{CRFM}$ in the plurality of EFMPRs R and a candidate reasoned failure mode. R$_{CRFM}$ may be chosen as the EFMPR that is the furthest from the origin of an evidentiary-failure-mode-probability graph. The distance D(R$_i$) an EFMPR R$_i$ in the plurality of EFMPRs R is from the origin may be determined using the distance formula:

$$D(R_i) = \sqrt{\text{avg\_fm}^2 + \text{avg\_e}^2}$$

where:
avg_fm=½(min_fm_p(R$_i$)+max_fm_p(R$_i$)) and
avg_e=½(min_e_p(R$_i$)+max_e_p(R$_i$)).

Further, FMRE 110 may use the sum of squares S(R$_i$) instead of the distance D(R$_i$). The sum of squares S(R$_i$) may be determined using the sum of squares formula below:

$$S(R_i) = \text{avg\_fm}^2 + \text{avg\_e}^2$$

If FMRE 110 uses the sum of squares instead of the distance, then $S(R_i)$ may be substituted for $D(R_i)$.

Note that the distance formula and the sum of squares formula above both use average failure mode and evidence probabilities, which correspond to the center of an EFMPR. Alternatively, the FMRE 110 may use the minimum failure mode and evidence probabilities in the distance or sum of squares formula, which would correspond to the lower-left corner of an EMFPR or the maximum failure mode and evidence probabilities in the distance or sum of squares formula, which would correspond to the upper-right corner of an EFMPR. For consistency, the FMRE 110 must use the same point on the rectangle in the distance or sum of squares formula—the center, the lower-left corner, or the upper-right corner—for calculating the distance from the origin for all EFMPRs in R.

The maximum distance MD may be determined by taking the maximum of the distances $D(R_i)$, where i is in the range of [1,NR]. Let $R_{CRFM}$ be the EMFPR whose distance from the origin is MD and as such is a candidate EFMPR corresponding to a candidate reasoned failure mode (CRFM).

At block 450, the FMRE 110 may determine the overlap area OA between EFMPR $R_{CRFM}$ and the other EFMPRs in the plurality of EFMPRs R. OA may be determined by the following process:
1. Set OA equal to 0.
2. Let min_fm_crfm be the minimum failure-mode probability of $R_{CRFM}$, max_fm_crfm be the maximum failure-mode probability of $R_{CRFM}$, min_e_crfm be the minimum evidence probability of $R_{CRFM}$, and max_e_crfm be the maximum evidence probability of $R_{CRFM}$. Then, using the axes shown in FIG. 2A, the lower-left corner of $R_{CRFM}$ would have coordinates of (min_fm_crfm, min_e_crfm) and the upper-right corner of $R_{CRFM}$ would have coordinates of (max_fm_crfm, max_e_crfm).
3. For each $R_i$ where i=[1 ... NR] and $R_i \neq R_{CRFM}$ (i.e., for each other EFMPR in the plurality of EFMPRs):
   a. Let min_fm_i be the minimum failure-mode probability of $R_i$, max_fm_i be the maximum failure-mode probability of $R_i$, min_e_i be the minimum evidence probability of $R_i$, and max_e_i be the maximum evidence probability of $R_i$.
   b. Determine if $R_i$ and $R_{CRFM}$ overlap by comparing (max_e_crfm>min_e_i) and (max_e_i>min_e_crfm) and (max_fm_crfm>min_fm_i) and (max_fm_i>min_fm_crfm). If any of those conditions is not true, then $R_i$ and $R_{CRFM}$ do not overlap, set current_OA=0 and proceed to item f. below.
   c. Determine the lower-left corner of an overlap region by determining (max_min_fm, max_min_e), where max_min_fm is the maximum of min_fm_i and min_fm_crfm and where max_min_e is the maximum of min_e_crfm and min_e_i.
   d. Determine the upper-right corner of the overlap region by determining (min_max_fm, min_max_e) where min_max_fm is the minimum of max_fm_crfm and max_fm_i and where min_max_e is the minimum of max_e_crfm and max_e_i.
   e. Determine current_OA=area of rectangle defined by lower-left corner of overlap region and upper-right corner of overlap region. Current_OA may be determined using the rectangle area formula based on the determined lower-left and upper-right corners. As such, current_OA may be set to (min_max_fm−max_min_fm)*(min_max_e−max_min_e).
   f. Update OA by adding current_OA to OA; that is, OA=OA+current_OA.

A confidence level of a candidate reasoned failure mode may be determined based on the overlap area OA. The confidence level may be determined by an arithmetical algorithm based on OA. For example, the confidence level may be determined by subtracting OA from the maximum probability of 1 (i.e. confidence level=1−OA), or by subtracting a power of OA from the maximum probability of 1 (e.g. confidence level=1−$OA^2$). Other algorithms for determining the confidence level are possible as well.

At block 460, the FMRE 110 may update the overlap threshold OT according to the cost of a corrective action for the failure mode associated with $R_{CRFM}$. Alternatively, the FMRE 110 may not update the overlap threshold OT.

The FMRE 110 may comprise an indicator to inhibit or allow updates to overlap threshold OT. The indicator to inhibit or allow updates to overlap threshold OT may be set via user input or via other means. If the indicator to inhibit or allow updates to overlap threshold OT is set to inhibit updates to overlap threshold OT, the overlap threshold OT may not be updated. If the indicator to inhibit or allow updates to overlap threshold OT is set to allow updates to overlap threshold OT, the overlap threshold OT may be updated according to the cost of the corrective action for the failure mode associated with $R_{CRFM}$.

At block 470, the FMRE 110 may compare the overlap threshold OT with the overlap area OA. If overlap threshold OT is less than OA, the FMRE 110 may proceed to block 480. If overlap threshold OT is greater than or equal to OA, the FMRE 110 may proceed to block 472.

At block 472, the FMRE 110 may request additional evidence. The FMRE 110 may request more evidence based on the time $T_{OLD}$ since the last notification of evidence and the evidence waiting time Delta. Let now be the current time and let $T_{ELAPSED}$=now−$T_{OLD}$. If $T_{ELAPSED}$ is less than or equal to Delta, the FMRE 110 may set $T_{OLD}$=now and proceed to step 420 to await more evidence. Alternatively, the FMRE 110 may sleep and/or set a timer for Delta units of time to await more evidence. If $T_{ELAPSED}$ is greater than Delta, the FMRE 110 may request more evidence.

The FMRE 110 may request more evidence by performing one or more tests on the evidence sources 150 and/or provide a notification on user interface 330 to request that a user to provide evidence. The user may provide evidence to FMRE 110 via either user input and/or entering commands to perform one or more tests. Alternatively, if $T_{ELAPSED}$ is greater than Delta, the FMRE 110 instead may wait for more evidence rather than requesting more evidence.

The one or more tests may provide evidence to FMRE 110 via evidence sources 150. The evidence may be filtered by evidence filter 140 and one or more evidence notifications may be sent from evidence filter 140 to FPSIM 120 to indicate evidence determined from the one or more tests.

After completing block 472, the FMRE 110 may proceed to block 420.

At block 480, the FMRE 110 may determine a reasoned failure mode and/or corrective action. As the overlap area OA of $R_{CRFM}$ is less than overlap threshold OT, the candidate reasoned failure mode may be determined to be the reasoned failure mode. The corrective action may be determined by applying a corrective action mapping described above with the reasoned failure mode as the key value. As such, one or more reasoned corrective actions may be determined to be a corrective action corresponding to the reasoned failure mode using the failure mode/corrective action mapping 560 or other similar data structure.

At block 482, the FMRE 110 may display the reasoned failure mode corresponding to the evidence presented and/or the one or more reasoned corrective actions to be taken. To display the reasoned failure mode and/or the one or more reasoned corrective actions, FMRE 110 may display a reasoned failure mode and corrective action report 600 to a user of the FMRE 110.

FIG. 6 is an example reasoned failure mode and corrective action report 600, in accordance with embodiments of the invention. For example, suppose three pieces of evidence were received at FMRE 110 for a diagnosable system of a motor vehicle:

1. The headlights will not light.
2. The engine of the motor vehicle will not turn over.
3. A battery is present in the motor vehicle.

The reasoned failure mode and corrective action report 600 includes a reasoned failure mode description 610, listing of evidence 620, and a corrective action list 630. As shown in FIG. 6, the failure mode description 610 is "discharged battery".

The listing of evidence 620 may comprise an evidence item number, such as "Evidence #1", an evidence description 622, and a failure-mode probability 624. As shown in FIG. 6, the evidence description 622 is "The headlights will not light" and the failure mode probability 624 is 0.3.

The corrective action list 630 may comprise one or more reasoned corrective actions. Note that a corrective action list may have zero, one, or more than one reasoned corrective action. If the corrective action list has zero reasoned corrective actions, the corrective action list 630 may not be displayed in the reasoned failure mode and corrective action report 600.

As shown in FIG. 6, two reasoned corrective action descriptions are provided in reasoned failure mode and corrective action report 600: a jump-start corrective action description 632 and a replace-battery corrective action description 634. As shown in FIG. 6, the jump-start corrective action description 632 is "Jump-start battery" and the replace-battery corrective action description 634 is "Replace battery". A reasoned failure mode and corrective action report 600 may comprise an indication of a cost of a reasoned corrective action. FIG. 6 shows reasoned failure mode and corrective action report 600 with a jump-start corrective action cost 636 of 1 and a replace-battery corrective action cost 638 of 3.

The reasoned corrective action list may be sorted. The reasoned corrective action list may be sorted in reverse-cost order (i.e., the least expensive actions listed first) based on the cost $C_i$ of a corresponding corrective action $CA_i$. As shown in FIG. 6, the corrective active list is shown in reverse-cost order, as the jump-start corrective action cost 636 of 1 is less than the replace-battery corrective action cost 638 of 3. Alternatively, the reasoned corrective action list may be sorted in highest-cost-order (i.e., the most expensive actions listed first).

Returning to FIG. 4, at block 490, the FMRE 110 may take a corrective action. The FMRE 110 may request input via user interface 330 and/or network-communication interface 340 to authorize that the corrective action should be taken and/or to carry out part or all of the corrective action. Also, the FMRE 110 may use user interface 330 and/or network-communication interface 340 to take the corrective action; for example, a corrective action may be taken by (a) sending a command to a device via network-communication interface 340 and/or (b) requesting user input, such as providing a report that a corrective action was performed by a user via user interface 330.

CONCLUSION

Exemplary embodiments of the present invention have been described above. Those skilled in the art will understand, however, that changes and modifications may be made to the embodiments described without departing from the true scope and spirit of the present invention, which is defined by the claims. It should be understood, however, that this and other arrangements described in detail herein are provided for purposes of example only and that the invention encompasses all modifications and enhancements within the scope and spirit of the following claims. As such, those skilled in the art will appreciate that other arrangements and other elements (e.g. machines, interfaces, functions, orders, and groupings of functions, etc.) can be used instead, and some elements may be omitted altogether.

Further, many of the elements described herein are functional entities that may be implemented as discrete or distributed components or in conjunction with other components, in any suitable combination and location, and as any suitable combination of hardware, firmware, and/or software.

The invention claimed is:

1. A method for determining a corrective action for a diagnosable system, the method comprising:
   receiving a first evidence notification;
   determining a plurality of evidentiary-failure-mode-probability rectangles (EFMPRs) based on the first evidence notification, wherein each EFMPR comprises a failure-mode probability range and an evidence probability range;
   determining a first candidate EFMPR in the plurality of EFMPRs;
   determining an overlap area between the first candidate EFMPR and the other EFMPRs in the first plurality of EFMPRs;
   determining the overlap area of the first candidate EFMPR is less than an overlap threshold; and
   responsive to determining that the overlap area of the first candidate EFMPR is less than the overlap threshold, determining a reasoned corrective action for the diagnosable system, based on the first candidate EFMPR.

2. The method of claim 1, further comprising determining a cost for each EFMPR.

3. The method of claim 2, further comprising determining the overlap threshold based on the cost of the candidate EFMPR.

4. The method of claim 1, further comprising displaying a notification of the first reasoned corrective action on a user interface.

5. The method of claim 1, further comprising taking the first reasoned corrective action.

6. The method of claim 1, further comprising:
   responsive to a determination that the overlap area of the candidate EFMPR is not less than the overlap threshold, receiving at least one additional evidence notification.

7. The method of claim 6, wherein the reasoned corrective action comprises a first reasoned corrective action, the overlap area is a first overlap area, and the overlap threshold comprises a first overlap threshold, the method further comprising:
   determining a second plurality of evidentiary-failure-mode-probability rectangles (EFMPRs) based on the first evidence notification and the at least one additional evidence notification;
   determining a second candidate EFMPR in the second plurality of EFMPRs;

determining a second overlap area of the second candidate EFMPR and other EFMPRs in the second plurality of EFMPRs;

determining the overlap area of the second candidate EFMPR is less than a second overlap threshold; and responsive to the determining that the second overlap area of the second candidate EFMPR is less than the second overlap threshold, determining a second reasoned corrective action of the diagnosable system, based on the second candidate EFMPR.

8. The method of claim 6, further comprising:

setting a timer;

upon expiration of the timer, requesting additional evidence.

9. The method of claim 8, wherein requesting additional evidence comprises sending a message to a user interface requesting additional evidence.

10. The method of claim 6, wherein requesting additional evidence comprises requesting at least one test of the diagnosable system.

11. The method of claim 6, further comprising: responsive to requesting additional evidence, receiving at least one evidence notification.

12. A failure mode reasoning engine (FMRE), comprising:

a processor;

a network-communication interface;

data storage, wherein a plurality of failure-mode-probability ranges, a plurality of evidence-probability ranges, and a plurality of corrective actions are stored in the data storage; and machine-language instructions stored in the data storage and executable by the processor to perform functions including:

receiving at least one evidence notification via the network-communication interface, determining a plurality of evidentiary-failure-mode-probability rectangles (EFMPRs), based on the at least one evidence notification, wherein each EFMPR comprises a failure-mode probability range and an evidence-probability range, determining a candidate EFMPR of the plurality of EFMPRs, determining a confidence level of the candidate EFMPR based on an overlap area between the candidate EFMPR and other EFMPRs in the plurality of EFMPRs and an overlap threshold, associating a corrective action with the candidate EFMPR, based on the plurality of corrective actions and the determined confidence level, and sending the corrective action via the network-communication interface.

13. The FMRE of claim 12, wherein at least one of the plurality of failure-mode-probability ranges, the plurality of evidence-probability ranges, and/or the plurality of corrective actions are stored in a failure-propagation-and-system/subsystem-interaction model (FPSIM) database.

14. The FMRE of claim 12, wherein the failure-mode probability range comprises a minimum failure-mode probability and a maximum failure-mode probability; and the evidence-probability range comprises a minimum evidence probability and a maximum evidence probability.

15. The FMRE of claim 14, wherein the machine language instructions for determining a plurality of evidentiary-failure-mode-probability rectangles (EFMPRs) further comprise instructions executable by the processor to:

determine at least one evidence location, at least one evidence type, and at least one evidence value, based on the at least one evidence notification;

determine the failure-mode probability range for each EFMPR, based on the at least one of at least one evidence location, at least one evidence type, or at least one evidence value; and determine the evidence-probability range for each EFMPR, based on the at least one of at least one evidence location, at least one evidence type, or at least one evidence value.

16. The FMRE of claim 15, wherein the machine language instructions to determine a plurality of evidentiary-failure-mode-probability rectangles (EFMPRs) comprise: combining the probability ranges of each EFMPR in the plurality of EFMPRs based on the at least one evidence notification received by the FMRE.

17. The FMRE of claim 12, wherein determining a confidence level comprises determining the confidence level by an arithmetical algorithm based on the overlap area of the candidate EFMPR.

18. The FMRE of claim 12, further comprising:

an evidence filter, wherein the machine-language instructions stored in the data storage further comprise instructions executable by the processor to filter at least one evidence notification via the evidence filter.

19. A diagnosable system, comprising:

one or more evidence sources configured to report a status of part or all of the diagnosable system; and a failure mode reasoning engine (FMRE), wherein the FMRE comprises:

an evidence filter configured to generate an evidence notification upon receipt of evidence from the one or more evidence sources, a failure-propagation-and-system/subsystem-interaction model (FPSIM) database configured to store a plurality of failure-mode probabilities, a plurality of evidence-probabilities, a plurality of conditional probabilities each indicating a probability of a specific failure mode given a specific piece of evidence, a plurality of conditional probabilities each indicating a probability of a specific piece of evidence given a specific failure mode, a failure mode/corrective action mapping, a corrective action/cost mapping, and a plurality of evidentiary-failure-mode-probability rectangles (EFMPRs), wherein each EFMPR comprises a failure-mode-probability range and an evidence-probability range, and a FPSIM configured to determine a corrective action for the diagnosable system based a comparison of an overlap area of a candidate EFMPR and an overlap area threshold, wherein the corrective action is determined based on the failure mode/corrective action mapping, wherein the overlap area threshold is determined based on a corrective-action cost, and wherein the corrective-action cost is based on the corrective action/cost mapping.

* * * * *